United States Patent [19]

Hiramatsu

[11] Patent Number: 5,991,281
[45] Date of Patent: Nov. 23, 1999

[54] ATM RADIO TRANSMISSION APPARATUS

[75] Inventor: Katsuhiko Hiramatsu, Yokohama, Japan

[73] Assignee: Matsushita Electric Industrial Co., Ltd., Osaka, Japan

[21] Appl. No.: 08/828,175

[22] Filed: Mar. 18, 1997

[30]     Foreign Application Priority Data

May 17, 1996  [JP]  Japan ................................... 8-146467

[51] Int. Cl.⁶ ....................................................... H04B 7/00
[52] U.S. Cl. ........................ 370/331; 370/349; 370/474; 455/38.3; 455/574
[58] Field of Search .................................... 370/331, 313, 370/342, 345, 349, 395, 465, 474; 455/38.3, 522, 550, 561, 574, 127

[56]              References Cited

U.S. PATENT DOCUMENTS

| 5,216,692 | 6/1993 | Ling ........................................ 455/38.3 |
| 5,434,859 | 7/1995 | Levardon ................................ 370/468 |
| 5,570,369 | 10/1996 | Jokinen et al. ........................ 455/38.3 |
| 5,623,486 | 4/1997 | Dohi et al. .............................. 455/38.3 |

FOREIGN PATENT DOCUMENTS 2115195  9/1983  United Kingdom .

OTHER PUBLICATIONS

Agrawal, P. et al.: "A Testbed for Mobile Networked Computing," Communications–Gateway to Globalization, Proceedings of the International Conference on Communications, Seattle, Jun. 18–22, 1995, vol. 1, Jun. 18, 1995, Institute of Electrical and Electronics Engineers, pp. 410–416, XP000533020.

Vary, P.: "Implementation Aspects of the Pan–European Digital Mobile Radio System," VLSI and Computer Peripherals, Hamburg, May 8–12, 1989, No. 1989, May 8, 1989, Proebster, W.E.; Reiner, H., pp. 4–17–22, XP000044178.

Published by OHM Co., Ltd., "Pictorial Text for ATM & Multi–media," Ch. 2, pp. 25–65.

*Primary Examiner*—Chi H. Pham
*Assistant Examiner*—Ricky Q. Ngo
*Attorney, Agent, or Firm*—Stevens, Davis, Miller & Mosher, L.L.P.

[57]              ABSTRACT

An ATM radio transmission apparatus includes an ATM unit having a normal operation mode and a low power consumption mode, a CPU for determining a transmission request based on information of a radio section, and a control line for switching an operation mode of the ATM unit from the CPU. The operation mode of the ATM unit is switched between the normal operation mode and the low power consumption mode in accordance with the transmission request of the radio section. When the reception is requested from a base station, the ATM unit is operated, and when the transmission/reception with the base station is completed, the ATM unit is shifted to the low power consumption mode to reduce the power consumption.

10 Claims, 8 Drawing Sheets

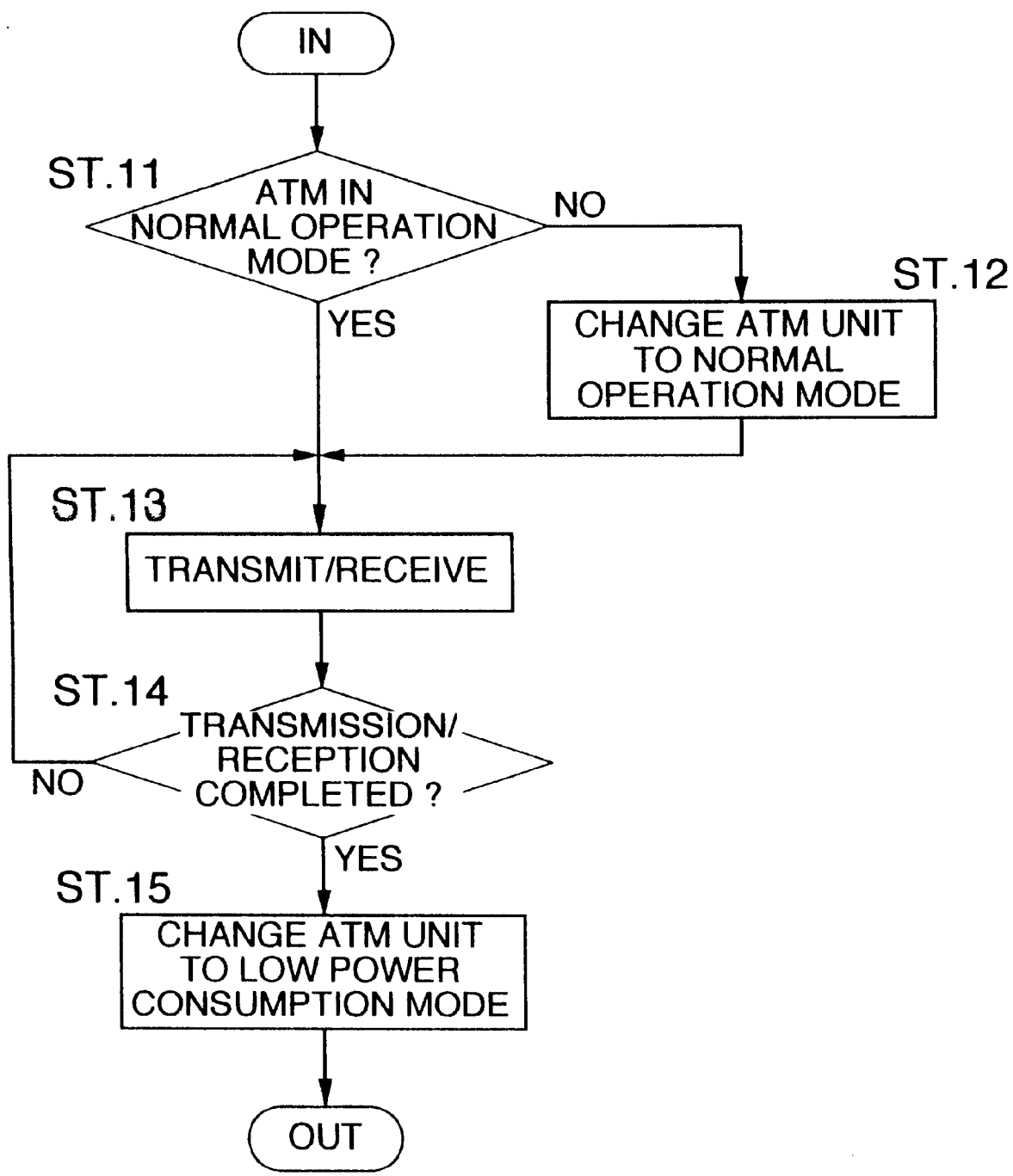

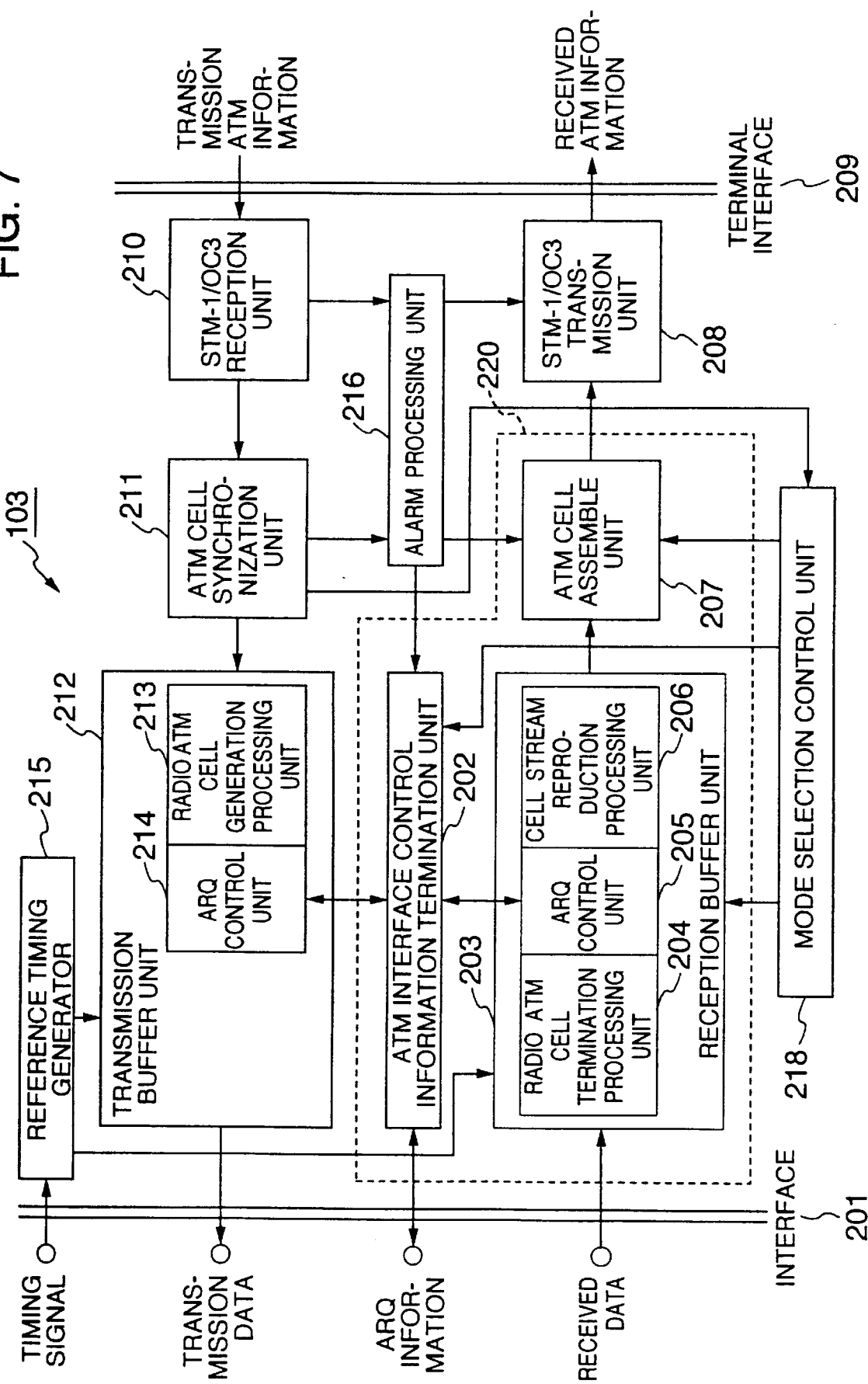

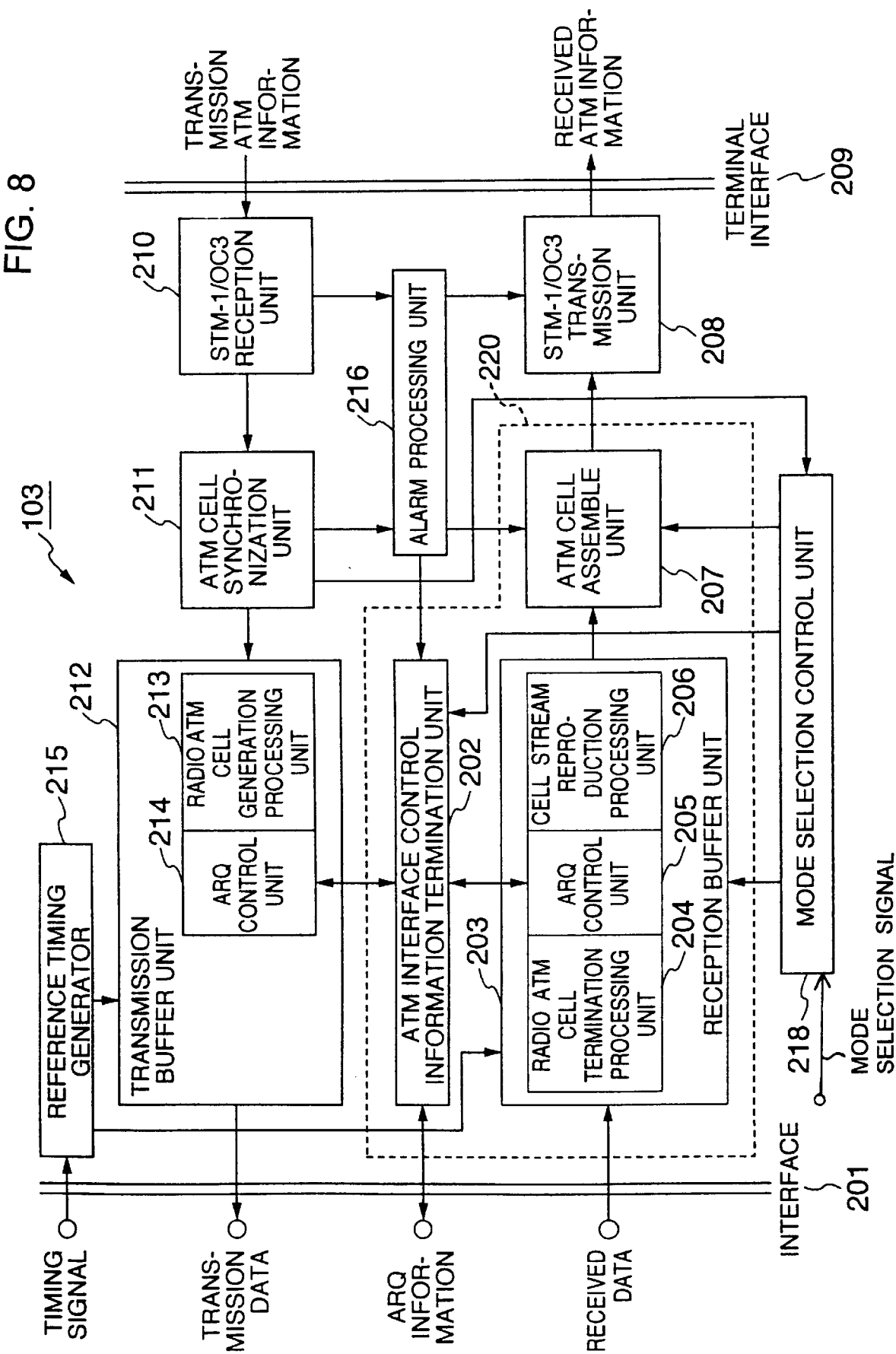

5,991,281

ATM RADIO TRANSMISSION APPARATUS

BACKGROUND OF THE INVENTION

1. Field of the Invention

The present invention relates to an ATM (asynchronous transfer mode) radio transmission apparatus which recovers data from ATM information included in a received radio signal or converts input data into ATM information and transmits it as a radio signal.

2. Description of the Related Art

In a broad band ISDN (B-ISDN), the ATM (which is a transfer mode for rapidly transmitting a large volume of information) has recently been adopted in place of a conventional synchronous transfer mode (STM), and an ATM radio transmission apparatus for radio-transmitting data by using the ATM has been developed.

An outline of the ATM is described in "Pictorial Text for ATM & Multi-media", chapter 2, published by OHM Co., Ltd.

A conventional ATM radio transmission apparatus comprises (1)a radio transmission unit for receiving a signal transmitted at a radio frequency, demodulating and channel-decoding the signal to obtain received date, and for channel-coding transmission data and performing modulation transmit the transmission data over a radio frequency, (2)an ATM unit for extracting desired received ATM information from the received data, and for preparing the transmission data on the basis of transmission ATM information, and (3)an ATM unit terminal such as a personal computer (PC) for displaying the data included in the received ATM information and for outputting the transmission ATM information to the ATM unit.

The ATM unit extracts cells of the received data to recover data and inserts cells into the transmission data. The cell is a unit of a block of information handled by the ATM and has a length of 53 bytes. Each cell comprises a cell header representing a cell attribute and user information.

In order to extract the cell of the received data, it is necessary to hold cell synchronization, that is, to locate the header of the cell from the received bit sequence and identify the cell having the 53-byte length.

An operation for holding the cell synchronization in the ATM unit is explained in the above-referenced article "Pictorial Text for ATM and Multi-media", FIG. 2–9.

In order to hold the cell synchronization, a "self-synchronization" function by an HEC (Header Error Control) is used. Three states transit before the cell synchronization is established. First, in "hunting state" in which a head of the cell is not known, a CRC of the header is calculated and the calculation is repeated by shifting the received bit sequence one bit by one bit until the remainder becomes the "0". When the remainder of the CRC becomes "0", the state becomes "pre-synchronization state". In the pre-synchronization state, the HEC of the header is calculated for every 53 bytes from the time point when the remainder first becomes "0" to determine the position of the cell. When the cell header is continuously identified six times as normal, the state becomes the "synchronization established state" or "synchronization state". If the correct HEC is not continuously identified six times, the process immediately returns to the "hunting state".

In the "synchronization established state", since the head position of the cell is identified, the HEC is calculated based thereon for every 53 bytes, and if it is correct, the synchronization established state is maintained. Even if an HEC error is detected in the course of this process, it is not determined as out-of-synchronization unless the error is continuously detected seven times, and the synchronization established state is maintained. When the HEC error is continuously detected seven times, it is immediately determined as out-of-synchronization and the process returns to the "hunting state" to start the identification of the head position of the cell.

The operation of not immediately causing the state to transit even if the condition change occurs is commonly referred to as "protection", and a period until shifting to the synchronization state is referred to as "backward protection" and a period until shifting out of the synchronization state is referred to as "forward protection".

Thus, in ATM unit, the processes for the following three states are conducted:

(1) In the "hunting state", the HEC calculation is effected by shifting the temporary 32-bit header one bit by one bit.

(2) In the "pre-synchronization state", the HEC calculation is effected for every 53 bytes.

(3) In the "synchronization state", the HEC calculation is effected for every 53 bytes.

However, in the process performed by the ATM unit, the HEC calculation needs a very high speed of operation of 156 Mbps and power consumption is large. Therefore, a problem exists in that the ATM radio transmission apparatus including the ATM unit is required to significantly reduce the power consumption in order to be conformed to a battery-driven system.

SUMMARY OF THE INVENTION

It is an object of the present invention to provide an ATM radio transmission apparatus which reduces the power consumption in order to solve the above problem of the prior art apparatus.

In the ATM radio transmission apparatus of the present invention, the ATM unit is provided with a normal operation mode and a low power consumption mode, and when the transmission/reception with a base station is completed or the exchange of data between the terminal and the ATM unit is completed, the ATM unit is shifted to the low power consumption mode to reduce the power consumption.

An ATM radio transmission apparatus according to a first aspect of the present invention comprises a radio transmission unit (102) for receiving a radio signal including ATM information, demodulating and decoding the received signal to obtain received data, and for encoding transmission data and modulating a radio signal by using the encoded transmission data to transmit the modulated radio signal, and an ATM unit (103) for extracting received ATM information from the received data output from said radio transmission unit, and for preparing the transmission data on the basis of transmission ATM information to output the transmission data to said radio transmission unit. The ATM unit (103) includes a mode selection control unit (217) for changing an operation of a portion of circuits included in said ATM unit between a normal mode and a low power consumption mode in accordance with a mode selection signal, and the radio transmission unit (102) includes control means (114) for generating said mode selection signal on the basis of a control signal including transmission start information transmitted from a base station.

An ATM radio transmission apparatus according to a second aspect of the present invention comprises a radio transmission unit (102) for receiving a radio signal including ATM information, demodulating and decoding the received signal to obtain received data, and for encoding transmission data and modulating a ratio signal by using the encoded transmission data to transmit the modulated radio signal, an ATM unit (103) for extracting received ATM information from the received data output from said radio transmission unit, and for preparing the transmission data on the basis of transmission ATM information to output the transmission data to said radio transmission unit, and a terminal (104) for processing the received ATM information output from said ATM unit, and for outputting the transmission ATM information to said ATM unit. The ATM unit (103) includes a mode selection control unit (218) for changing an operation mode of a portion of circuits included in said ATM unit between a normal mode and a low power consumption mode in accordance with a predetermined signal included in the transmission ATM information output from said terminal.

BRIEF DESCRIPTION OF THE DRAWINGS

FIG. 6 shows a flow chart of an operation procedure of the ATM radio transmission apparatus as shown in FIG. 5;

FIG. 7 shows a block diagram of a configuration of an ATM unit included in the ATM radio transmission apparatus as shown in FIG. 5; and FIG. 8 shows a modified embodiment of the ATM radio apparatus of FIG. 7.

DETAILED DESCRIPTION OF THE PREFERRED EMBODIMENTS

First Embodiment

Figure 1:
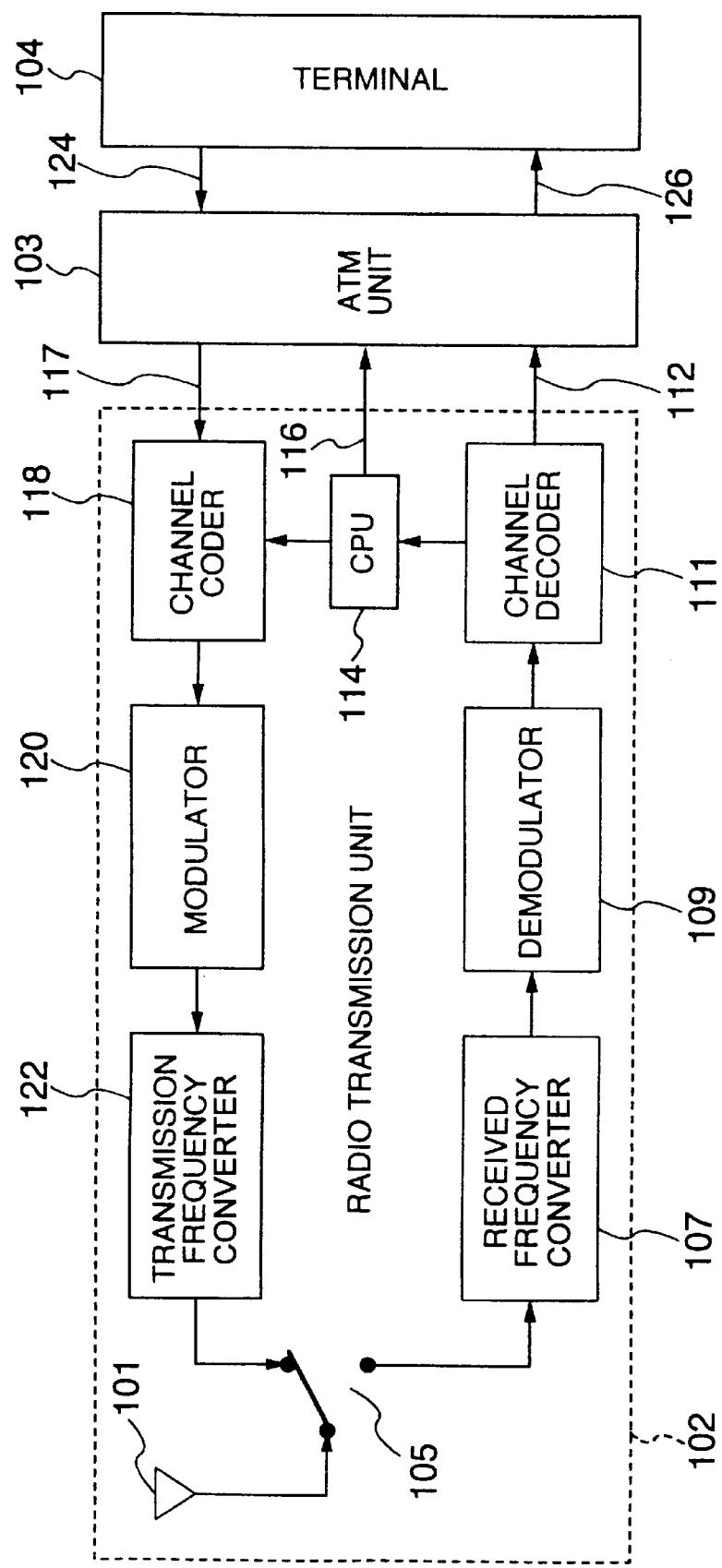
FIG. 1 shows a block diagram of a configuration of an ATM radio transmission apparatus according to a first embodiment of the present invention.

As shown in FIG. 1, an ATM radio transmission apparatus according to a first embodiment of the present invention comprises a radio transmission unit 102 for receiving a signal transmitted at a radio frequency, demodulating and channel-decoding it to obtain received data 112, and for channel-coding transmission data 117 and performing modulation to transmit it over a radio frequency, an ATM unit 103 for extracting desired received ATM information 126 from the received data 112, and for preparing the transmission data 117 based on transmission ATM information 124, and an ATM unit terminal 104 such as a personal computer for displaying data included in the received ATM information 126, and for outputting the transmission ATM information 124.

In the present invention, the ATM unit 103 has a normal operation mode and a low power consumption mode in which operation of a portion of the circuits is stopped or operated at a low speed.

The ATM radio transmission apparatus of the first embodiment is explained in detail.

The radio transmission unit 102 comprises an antenna 101 for transmission and reception, a received frequency converter 107 for down-converting a frequency of a received signal from a radio frequency to a base band frequency, a demodulation circuit 109 for demodulating a base band signal, a channel decode circuit 111 for decomposing the demodulated signal into information bits, a channel code circuit 118 for allocating transmission ATM information to a plurality of slots and adding error correction codes, a modulation circuit 120 for conducting modulation by using the encoded data, a transmission frequency conversion circuit 122 for converting a frequency of the modulated signal to a radio frequency, a switch 105 for selectively connecting the antenna 101 to a transmitter side or a receiver side, and a CPU 114 for controlling operations of the radio transmission unit 102 and transmitting a mode selection signal to the ATM unit 103 through a control line 116 to change the operation mode of the ATM unit 103 between the normal operation mode and the low power consumption mode.

In the radio transmission unit 102, the switch 105 connects the antenna 101 to the receiver side in the reception mode, and the signal received by the antenna 101 is down-converted from the radio frequency to the base band frequency by the received frequency converter 107. The signal is then demodulated by the demodulation circuit 109 and decomposed to information bits by the channel decode circuit 111.

On the other hand, in the transmission mode, the transmission ATM information is allocated to the plurality of slots by the channel code circuit 118 and error correction codes are added. The data is then modulated by the modulation circuit 120, converted to the radio frequency by the transmission frequency converter 122 and transmitted from the antenna 101 through the switch 105 changed to the transmitter side.

In the present embodiment, the CPU 114 controls the operation mode of the ATM unit 103 to the normal operation mode or the low power consumption mode based on the received ATM information decoded by the channel decode circuit 111, and this is a difference from the conventional apparatus.

A method for selecting the operation mode of the ATM unit 103 by the CPU 114 of the radio transmission unit 102 is explained.

Figure 2:
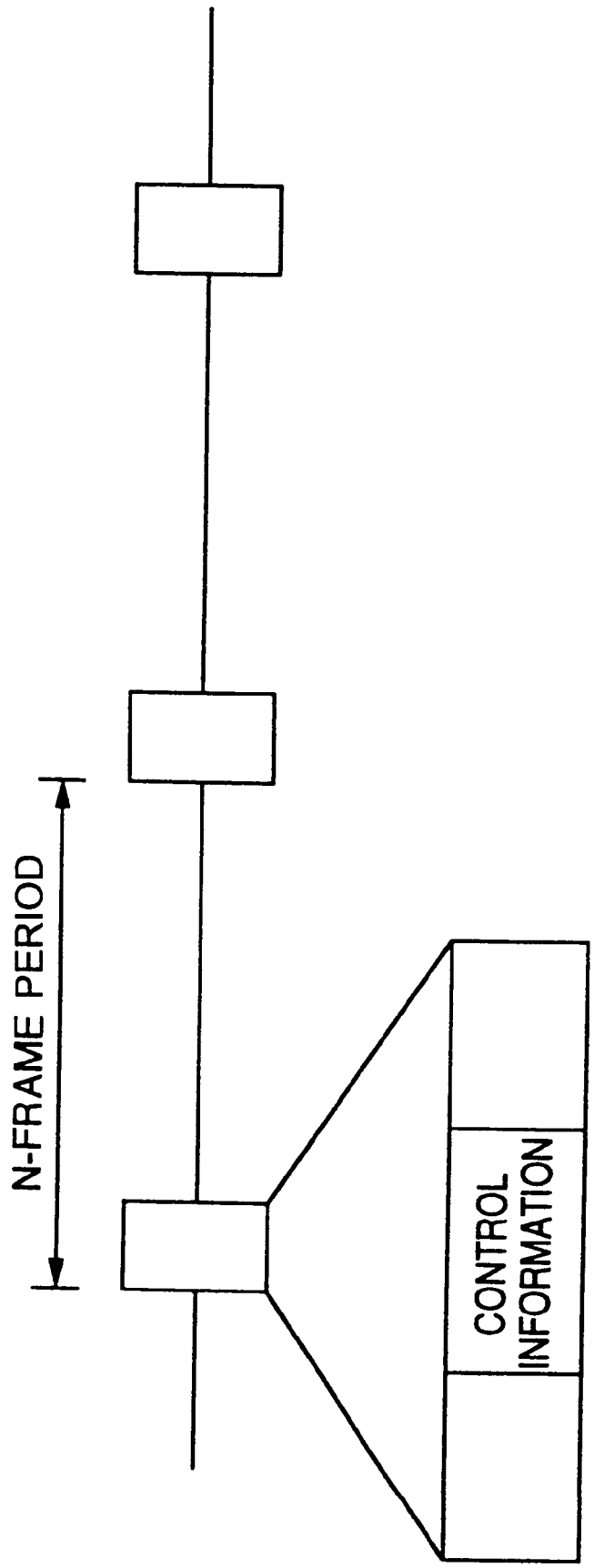
FIG. 2 shows a frame format of a super frame transmitted by the ATM radio transmission apparatus.

As shown in FIG. 2, when the radio transmission is not effected, the radio transmission unit 102 effects the super frame reception to transmit and receive information with the base station once in a time period corresponding to several frames to several tens of frames (N-frame period). The information transmitted by the super frame reception includes control information, and when the base station starts the normal transmission to the radio transmission unit 102 by using a down link, it transmits the transmission start information in the control information.

Since the ATM unit 103 need not operate until the transmission start information is transmitted from the base station, the CPU 114 controls the ATM unit 103 to shift to the low power consumption mode by using the mode selection signal 116 until the transmission start information is transmitted.

Figure 3:
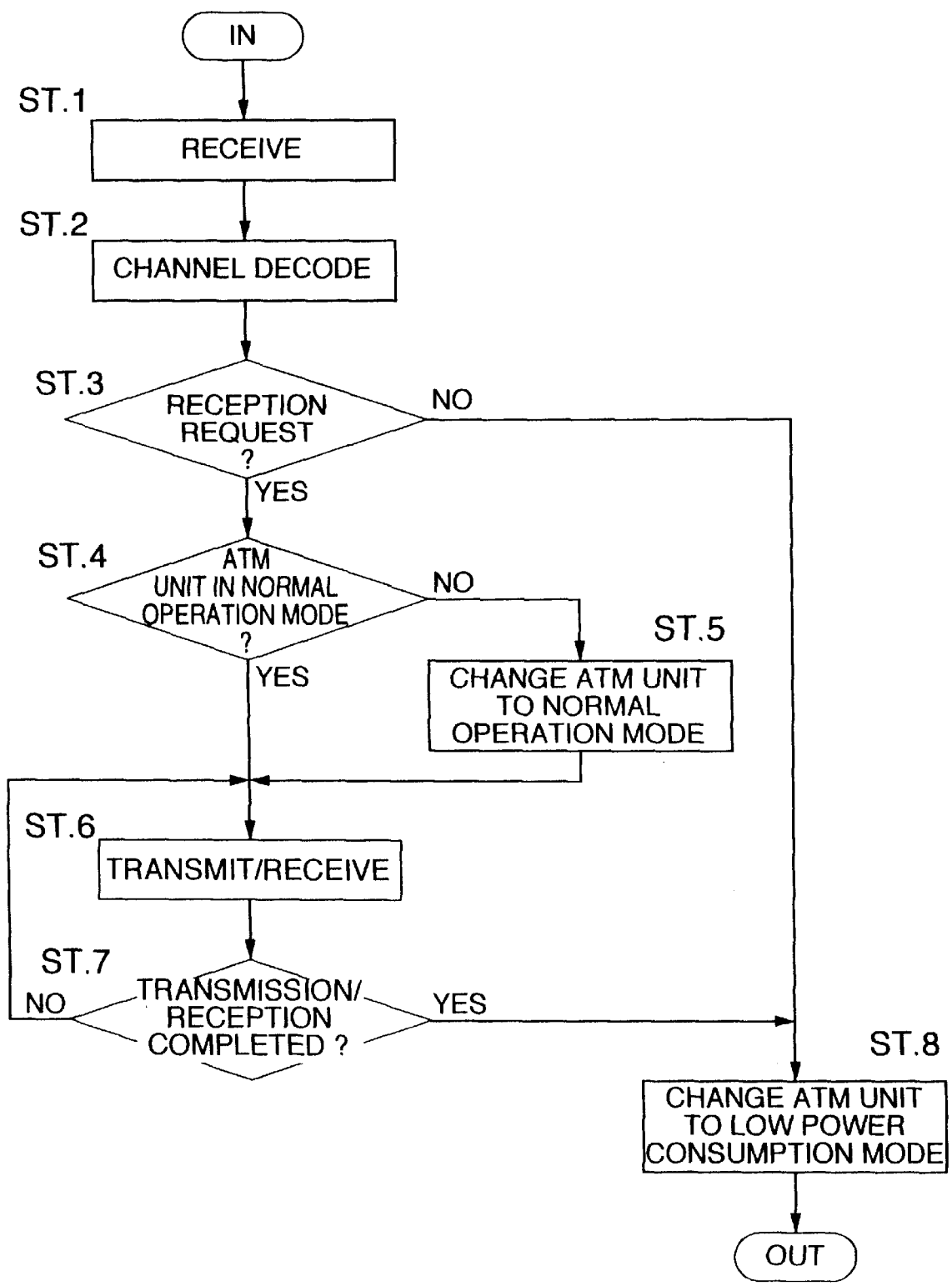
FIG. 3 shows a flow chart of an operation procedure of the ATM radio transmission apparatus as shown in FIG. 1.

A control procedure thereof is explained with reference to FIG. 3.

When the radio transmission unit 102 receives a signal on the down link (step 1), it channel-decodes the signal to decode a reception request from the base station (step 2). When the reception request from the base station is detected (step 3) and if the current operation mode of the ATM unit 103 is the normal operation mode (step 4), it continues the reception until the transmission from the base station is completed and outputs the received ATM information to the ATM unit 103 (step 6). When there is data to be transmitted from the ATM unit on an up link, the radio transmission unit 102 transmits it to the base station on the up link.

In the step 4, if the current operation mode of the ATM unit 103 is not the normal operation mode, the CPU 114 of the radio transmission unit 102 controls the ATM unit 103 to shift to the normal operation mode (step 5), and the process proceeds to the step 6.

When the transmission or the reception is completed (step 7), the CPU 114 controls the ATM unit 103 to shift to the low power consumption mode (step 8) and the process waits for the next super frame reception.

Figure 4:
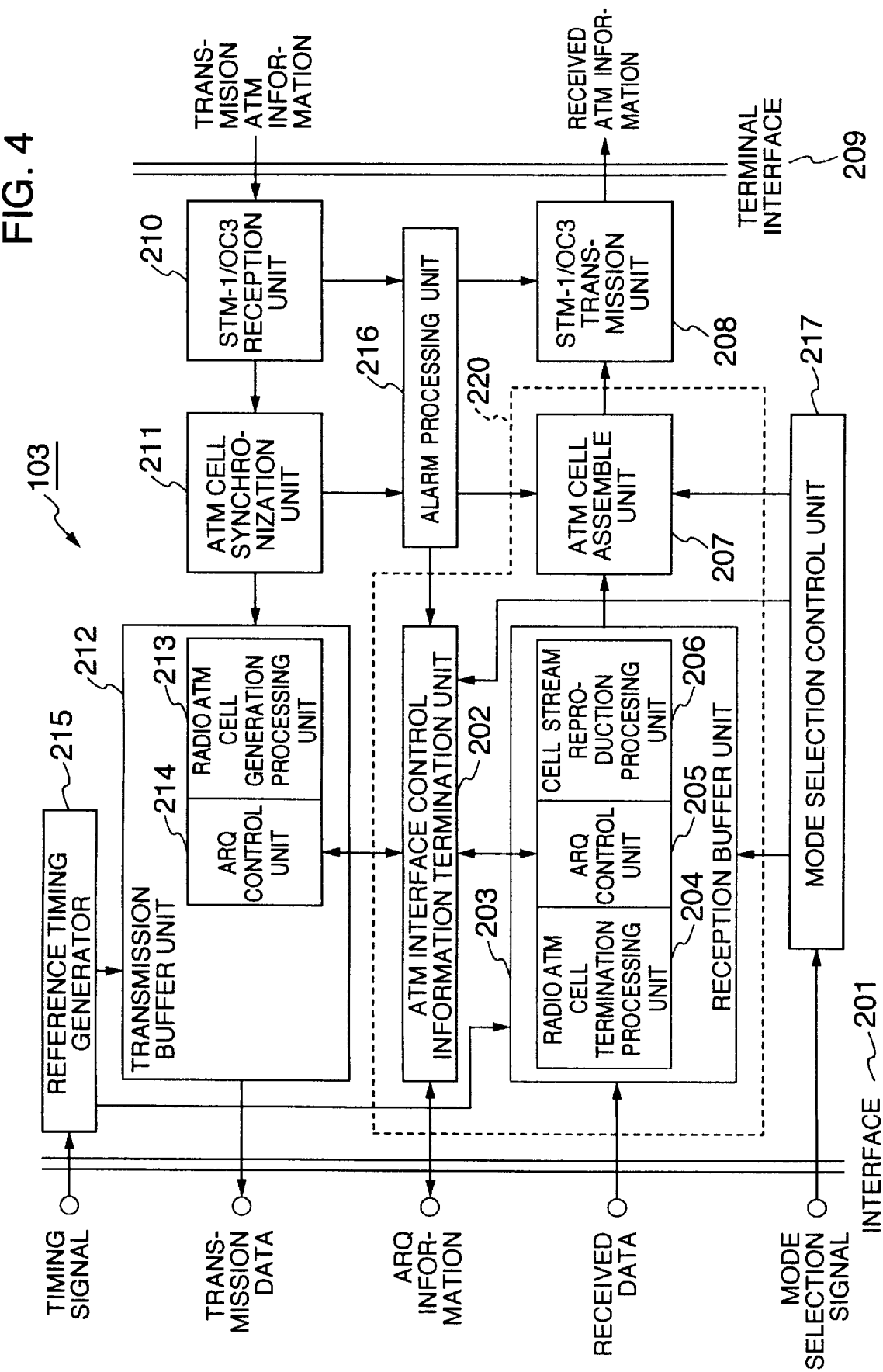
FIG. 4 shows a block diagram of a configuration of an ATM unit included in the ATM radio transmission apparatus as shown in FIG. 1.

FIG. 4 shows a block diagram of a configuration of an internal circuit of the ATM unit 103. In FIG. 4, the received data is supplied from the radio transmission unit to a reception buffer 203 through an interface 201. The reception buffer 203 comprises an ATM cell end processing unit 204, an ARQ (automatic request for repetition) control unit 205 and a cell stream reproduction processing unit 206. The received data output from the reception buffer 203 is input to an ATM cell assemble unit 207 which assembles the ATM cells from the received data to prepare the received ATM information. The received ATM information is converted to an optical signal by an STM-1/OC3 transmission unit 208 and transmitted to an terminal by an optical fiber through a terminal interface 209.

On the other hand, an STM-1/OC3 receive unit 210 receives the transmission ATM information transmitted from the terminal over the optical fiber as the optical signal through the terminal interface 209, converts it to an electrical signal and supplies it to an ATM cell synchronization unit 211. The ATM cells are synchronized by the ATM cell synchronization unit 211 and transmission data is prepared by a radio ATM cell generation processing unit 213 included in a transmission buffer unit 212 based on the information included in the ATM cells. The transmission buffer unit 212 also includes an ARQ control unit 214. An ATM interface control information termination unit 202 controls the ARQ information through ARQ control units 205 and 214. The transmission data is transmitted to the radio transmission unit through the interface 201.

A reference timing generation unit 215 receives a timing signal from the radio transmission unit through the interface 201 to generate timing for time stamps and various reference timings. An alarm processing unit 216 detects the abnormality in the data transmitted from the terminal and notifies the abnormal state to the ATM interface control information termination unit 202.

Of the above components, the components necessary to maintain the minimum necessary functions in the reception stand-by state are the STM-1/OC3 transmission unit 208, the STM-1/OC3 reception unit 210, the ATM cell synchronization unit 211, the transmission buffer 212, the reference timing generation unit 215 and the alarm processing unit 216. Other circuits, that is, the ATM interface control information termination unit 202, the reception buffer 203 and the ATM cell assembly unit 207 in the block 202 surrounded by broken lines in FIG. 4 need not be operated when the line is not connected to other ATM radio transmission apparatus so that the operations of those circuits are stopped to reduce the power consumption. As for the reception buffer unit 203 and the ATM cell assembly unit 207, the operation may be changed to low speed operation instead of stopping the operation of the circuits so that the power consumption is also reduced. The stop of the operation of the circuit or the low speed operation is herein referred to as the low power consumption mode.

The mode selection control unit 217 responds to the mode selection signal from the radio transmission unit to control the circuits in the block 220 to the normal mode or the low power consumption mode. When the low speed operation is to be conducted, only the reception buffer unit 203 and the ATM cell assembly unit 207 are controlled.

As the terminal 104 in FIG. 1, a personal computer or a television conference system having the ATM interface may be used.

By stopping the operation or performing the low speed operation of the ATM unit, which in the high speed operation has large power consumption, while the data transmission and reception are not conducted, low power consumption is attained.

Second Embodiment

The terminal 104 displays the information received from the ATM unit 103 and prepares the data to be transmitted and transfers it to the ATM unit 103. However, in the conventional ATM radio transmission apparatus, the ATM unit 103 must always monitor the data flowing over the signal line and the power consumption therefor is large.

Figure 5:
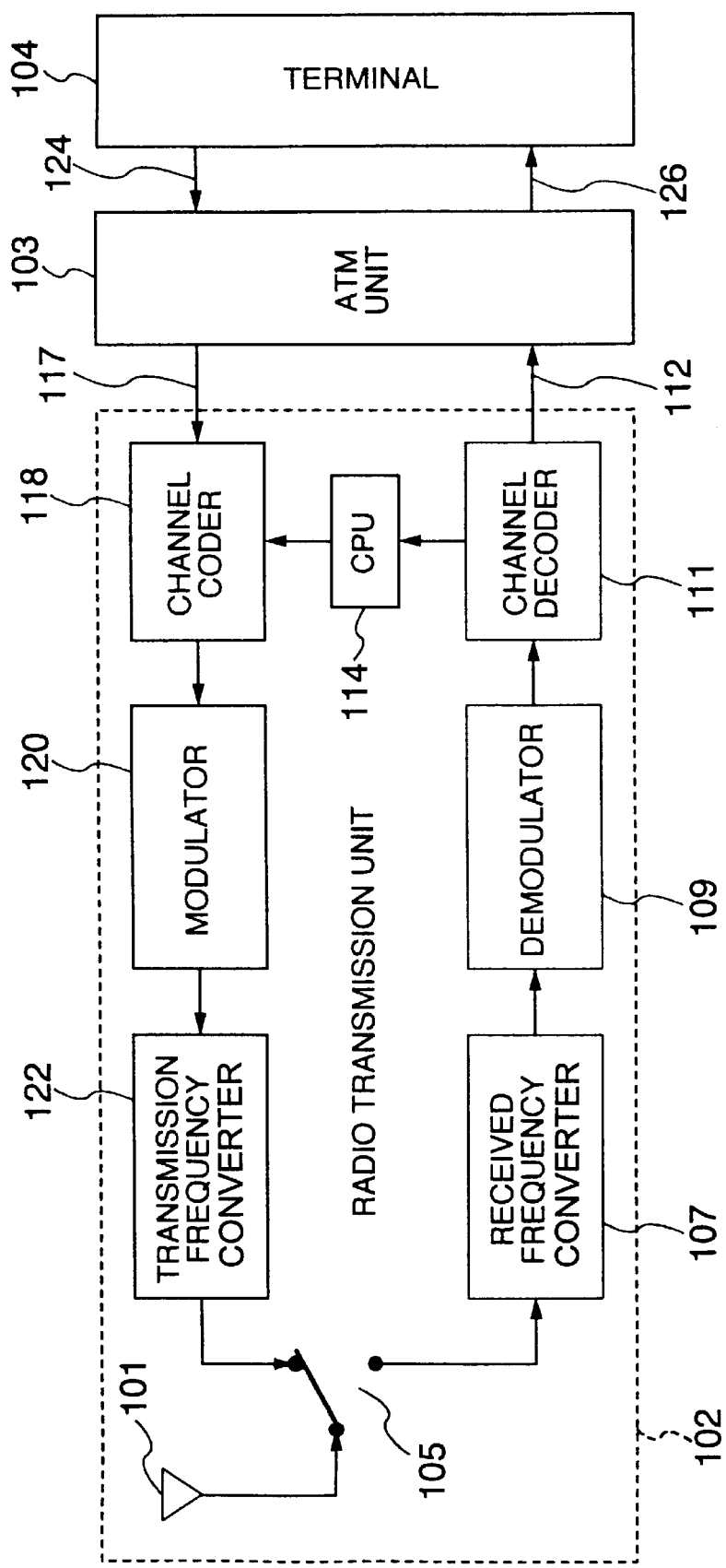
FIG. 5 shows a block diagram of a configuration of an ATM radio transmission apparatus according to a second embodiment of the present invention.

In an ATM radio transmission apparatus according to a second embodiment of the present invention as shown in FIG. 5, the terminal 104 inserts a terminal operation start/end signal to the ATM cell and outputs it to the ATM unit 103, and the ATM unit 103 detects the terminal operation start/end signal and changes the operation between the normal mode and the low power consumption mode based on the detected signal so that the power consumption is reduced.

An operation after the transmission request is explained with reference to a flow chart of FIG. 6.

When the operation mode of the ATM unit 103 is the normal operation mode (step 11), the data is derived from the terminal 104 to the ATM unit 103. The data is then output from the ATM unit 103 to the radio transmission unit 102, and the radio transmission unit 102 transmits it to the base station (step 13). Also, the radio transmission unit 102 can receive the data transmitted from the base station.

In the step 11, if the operation mode of the ATM unit 103 is not the normal operation mode, the operation mode of the ATM unit 103 is changed to the normal operation mode (step 12) and the process proceeds to the step 13.

When the transmission/reception is completed (step 14), the ATM unit 103 is changed to the low power consumption mode (step 15).

FIG. 7 shows a block diagram of a configuration of an internal circuit of the ATM unit 103. In FIG. 7, the difference from FIG. 4 which shows the first embodiment is explained. The mode selection control unit 218 receives the ATM cell from the synchronization unit 211 to detect the terminal operation start/end signal therefrom, and when it is determined that the terminal is in operation, it controls the circuits in the block 220 to the normal operation mode. When it is determined that the terminal is not in operation and the base station does not transmit, it controls the circuits in the block 220 to the low power consumption mode. When the low speed operation is to be conducted, only the reception buffer unit 203 and the ATM cell assembly unit 207 are controlled, similarly to the first embodiment.

By stopping the operation or performing the low speed operation of the ATM unit, which needs high speed operation and consumes large power, while the data transmission/reception is not conducted to shift it to the low power consumption mode, the low power consumption is attained.

The first embodiment and the second embodiment described above may be built in one ATM radio transmission apparatus as shown in FIG. 8. In this case, when at least one of the mode selection signal derived from the radio transmission unit and the terminal operation start/end signal derived from the terminal indicates to change to the normal mode, the circuits are controlled to the normal mode, and if both signals indicate to change to the low power consumption mode, the circuits are controlled to the low power consumption mode.

What is claimed is:

1. An ATM (asynchronous transfer mode) radio transmission apparatus comprising:

a radio transmission unit for receiving a radio signal including ATM information, demodulating and decoding the received signal to obtain received data, and for encoding transmission data and modulating a radio signal by using the encoded transmission data to transmit the modulated radio signal;

an ATM unit for extracting received ATM information from the received data output from said radio transmission unit, and for preparing the transmission data on the basis of transmission ATM information to output the transmission data to said radio transmission unit;

said ATM unit including a mode selection control unit for changing an operation of a portion of circuits included in said ATM unit between a normal mode and a low power consumption mode in accordance with a mode selection signal; and said radio transmission unit including control means for generating said mode selection signal on the basis of a control signal including transmission start information transmitted from a base station.

2. An ATM radio transmission apparatus comprising:

a radio transmission unit for receiving a radio signal including ATM information, demodulating and decoding the received signal to obtain received data, and for encoding transmission data and modulating a radio signal by using the encoded transmission data to transmit the modulated radio signal;

an ATM unit for extracting received ATM information from the received data output from said radio transmission unit, and for preparing the transmission data on the basis of transmission ATM information to output the transmission data to said radio transmission unit;

a terminal unit for processing the received ATM information output from said ATM unit, and for outputting the transmission ATM information to said ATM unit; and said ATM unit including a mode selection control unit for changing an operation mode of a portion of circuits included in said ATM unit between a normal mode and a low power consumption mode in accordance with a predetermined signal included in the transmission ATM information output from said terminal unit.

3. An ATM transmission apparatus according to claim 1, further comprising:

a terminal unit for processing the received ATM information output from said ATM unit, and for outputting the transmission ATM information to said ATM unit;

wherein said mode selection control unit changes said operation mode of said portion of circuits included in said ATM unit between the normal mode and the low power consumption mode in accordance with a predetermined signal included in the transmission ATM information output from said terminal unit.

4. An ATM radio transmission apparatus according to claim 1, wherein said ATM unit stops the operation of the portion of the circuits included in said ATM unit in the low power consumption mode.

5. An ATM radio transmission apparatus according to claim 2, wherein said ATM unit stops the operation of the portion of the circuits included in said ATM unit in the low power consumption mode.

6. An ATM radio transmission apparatus according to claim 3, wherein said ATM unit stops the operation of the portion of the circuits included in said ATM unit in the low power consumption mode.

7. An ATM radio transmission apparatus according to claim 1, wherein said ATM unit operates the portion the circuits included in said ATM unit at a low speed in the low power consumption mode.

8. An ATM radio transmission apparatus according to claim 2, wherein said ATM unit operates the portion the circuits included in said ATM unit at a low speed in the low power consumption mode.

9. An ATM radio transmission apparatus according to claim 3, wherein said ATM unit operates the portion the circuits included in said ATM unit at a low speed in the low power consumption mode.

10. An ATM radio transmission apparatus according to claim 3, wherein said mode selection control unit sets said portion of circuits in said normal mode when at least one of said mode selection signal from said radio transmission unit and said predetermined signal from said terminal unit indicates operation in said normal mode and sets said portion of circuits in said low power consumption mode when both said mode selection signal from said radio transmission unit and said predetermined signal from said terminal unit indicate operation in said low power consumption mode.

* * * * *